United States Patent
Yu

(10) Patent No.: US 9,269,333 B2
(45) Date of Patent: Feb. 23, 2016

(54) TERMINAL AND METHOD FOR CHARGING AND DISCHARGING THEREOF

(75) Inventor: Haifeng Yu, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 248 days.

(21) Appl. No.: 13/812,626

(22) PCT Filed: Jul. 20, 2011

(86) PCT No.: PCT/CN2011/077375
§ 371 (c)(1),
(2), (4) Date: Jan. 28, 2013

(87) PCT Pub. No.: WO2012/013129
PCT Pub. Date: Feb. 2, 2012

(65) Prior Publication Data
US 2013/0127687 A1    May 23, 2013

(30) Foreign Application Priority Data
Jul. 26, 2010  (CN) .......................... 2010 1 0239260

(51) Int. Cl.
  *G09G 5/38*  (2006.01)
  *H01M 10/44* (2006.01)
  *H02J 7/00*  (2006.01)

(52) U.S. Cl.
  CPC ................ *G09G 5/38* (2013.01); *H01M 10/44* (2013.01); *H02J 7/0013* (2013.01); *H02J 7/0054* (2013.01); *H02J 7/0068* (2013.01)

(58) Field of Classification Search
  CPC ......... G06F 1/1677; G06F 1/3203; H02J 7/02
  USPC ........................................... 345/30
  See application file for complete search history.

(56) References Cited

U.S. PATENT DOCUMENTS 7,166,988 B2 * 1/2007 Maskatia et al. .............. 320/116
7,545,118 B2   6/2009 Kim (Continued)

FOREIGN PATENT DOCUMENTS

CN   1482726   3/2004
CN   1664751   9/2005

(Continued)

OTHER PUBLICATIONS

PCT/CN2011/077375 International Preliminary Report on Patentability dated Jan. 29, 2013 (9 pages).

(Continued)

*Primary Examiner* — Amare Mengistu
*Assistant Examiner* — Shawna Stepp Jones
(74) *Attorney, Agent, or Firm* — Brinks Gilson & Lione; G. Peter Nichols

(57) ABSTRACT

A terminal and a method for charging and discharging is described. The terminal includes a first hardware system and a second hardware system. The first hardware system includes a first processing unit, a first charging unit, a first switching unit, and a first battery unit. The second hardware system includes a second processing unit and a second battery unit. On the basis of a first status information piece and/or a second status information piece, the first processing unit controls the first charging unit to charge the first battery unit and/or the second battery unit via the first switching unit, or, the first processing unit controls the first switching unit to select the first battery unit or the second battery unit to supply the first hardware system with electricity.

12 Claims, 14 Drawing Sheets

(56) References Cited

U.S. PATENT DOCUMENTS

| | | |
|---|---|---|
| 2005/0189922 A1 | 9/2005 | Maskatia et al. |
| 2006/0103353 A1 | 5/2006 | Kim |
| 2007/0236408 A1 | 10/2007 | Yamaguchi et al. |
| 2009/0160404 A1* | 6/2009 | Iwai .............................. 320/138 |
| 2010/0182265 A1* | 7/2010 | Kim et al. ..................... 345/173 |

FOREIGN PATENT DOCUMENTS

| | | |
|---|---|---|
| CN | 1776993 | 5/2006 |
| GB | 2352887 | 2/2001 |
| JP | 2008-17592 | 1/2008 |

OTHER PUBLICATIONS

PCT/CN2011/077375 International Search Report dated Oct. 27, 2011 (2 pages).
Chinese First Office Action with English Translation for related Application No. 2010102392260.6 dated Feb. 27, 2013 (30 pages).
Chinese Second Office Action with English Translation for related Application No. 2010102392260.6 dated Aug. 2, 2013 (34 pages).
Rejection Decision with English Translation for related Application No. 2010102392260.6 dated Jan. 30, 2014 (32 pages).

* cited by examiner

TERMINAL AND METHOD FOR CHARGING AND DISCHARGING THEREOF

This application claims priority to International Application No. PCT/CN2011/077375 filed Jul. 20, 2011; and to Chinese Patent Appln. CN 201010239260.6 filed on Jul. 26, 2010, the entire contents of each are incorporated herein by reference.

The present invention relates to a field of terminal technology, particularly to a terminal and method for charging and discharging.

BACKGROUND

With the development of terminal technology, portable devices for personal computations are more and more popular, such as pads, portable displays or the like. These light personal computing devices all use rechargeable batteries to supply electricity for a certain period of time. However, limited by its volume, the provided rechargeable battery cannot provide sufficient electric power to meet the power needs in a portable state. For example, for a portable display, when the battery of its own is out of power and the user cannot recharge the portable display in time, it is obvious that the portable display cannot work, thereby losing the meaning of portable.

At present, although there are typical scenes where two portable devices are connected (for example, a notebook is connected to as mobile phone and the two can exchange data), when the notebook is working, it cannot acquire the state information of the battery of the mobile phone. Moreover, it cannot select its own charging circuit to charge the mobile phone or to charge both of its own battery and the battery of the mobile phone at the same time on the basis of the state information of its own battery and state information of the battery of the mobile phone. When the notebook's own battery is in the low battery status, the notebook cannot control the battery of the mobile phone to supply electricity for the notebook either.

Based on this, during the process of the research and practice of the prior art, the inventor of the present invention has found that by means of the prior implementation, after two portable devices are connected, the processing unit of one of the portable dives cannot acquire the status information of the batteries of the two portable devices, so it cannot control which battery should be charged or whether the both two batteries should be changed simultaneously by the charging circuit; similarly, the processing unit cannot flexibly control which one of the two batteries should supply electricity for the portable devices.

SUMMARY

The embodiment of the present invention provide a terminal and a charging and discharging method thereof, so that a bidirectional sharing of battery power between two portable terminals is allowed and the utilization of portable terminals as well as the stability and usability of portable terminals are improved.

In order to address the above technical problem, an embodiment of the present invention provides a terminal, comprising: a first hardware system and a second hardware system, the first hardware system comprising, a first processing unit, a first charging unit, a first switching unit, and a first battery unit, the first processing unit being connected to the first charging unit and the first switching unit respectively, the first switching unit being connected to the first battery unit and the first charging unit; the second hardware system comprising a second processing unit and a second battery unit, the second processing unit being connected to the second battery unit, the first processing unit being connected to the second processing unit, the second battery unit being connected to the first switching unit, wherein, the first processing unit acquires first status information of the first battery unit, and acquires second status information of the second battery unit via the second processing unit; and on the basis of the first status information, controls the first charging unit to select to charge the first battery unit; or on the basis of the second status information, controls the first charging unit to select to charge the second battery unit; or on the basis of the first status information and the second status information, controls the first charging unit to select to charge the first battery unit or the second battery unit; or on the basis of the first status information and/or the second status information, controls the first switching unit to select the first battery unit or the second battery unit to supply the first hardware system with electricity.

An embodiment of the present invention further provides an another terminal, the terminal comprising a first processing unit, a first charging unit, a first switching unit, and a first battery unit, the first processing unit being connected to the first charging unit and the first switching unit respectively, the first processing unit of the terminal being connected to the second processing unit of a second terminal; the first switching unit being connected to the first battery unit, the first charging unit and the second battery unit of the second terminal respectively, wherein, the first processing unit is used to control the first charging unit to select to charge the first battery unit or/and the second battery unit via the first switching unit; or, the first processing unit acquires first status information of the first battery unit; acquires second status information of the second battery unit via the second processing unit, and on the basis of the first status information and/or the second status information, controls the first switching unit to select the first battery unit or the second battery unit to supply the terminal with electricity.

Correspondingly, an embodiment of the present invention further provides a charging and discharging method of a terminal, the terminal comprising: a first hardware system and a second hardware system, the first hardware system comprising: a first processing unit, a first charging unit, as first switching unit, and a first battery unit, the first processing unit being connected to the first charging unit and the first switching unit respectively, the first switching unit being connected to the first battery unit and the first charging unit; the second hardware system comprising: a second processing unit and a second battery unit, the second processing unit being connected to the second battery unit, the second battery unit being connected to the first switching unit, the first processing unit being connected to the second processing unit; the method comprising: the first processing unit acquiring first status information of the first battery unit, and second status information of the second battery unit is the second processing unit; the first processing unit controlling the first charging unit to select to charge the first battery unit on the basis of the first status information; or controlling the first charging unit to select to charge the second battery unit on the basis of the second status information; or controlling the first charging unit to select to charge the first battery unit or the second battery unit on the basis of the first status information and the second status information; or controlling the first switching unit to select the first battery unit or the second battery unit to supply the first hardware system with electricity on the basis of the first status information and/or the second status information.

An embodiment of the present invention further provides an another charging and discharging method of a terminal, the terminal comprising: a first processing unit, a first charging unit, a first switching unit and a first battery unit, the first processing unit being connected to the first charging unit and the first switching unit respectively, the first processing unit of the terminal being connected to the second processing unit of the second terminal; the first switching unit being connected to the first battery unit, the first charging unit and the second battery unit of the second terminal respectively: the method comprising: the first processing unit controlling the first charging unit to select to charge the first battery unit or/and the second battery unit via the first switching unit: the first processing unit acquiring first status information of the first battery unit, and second status information of the second battery unit via the second processing unit; and on the basis of the first status information and/or the second status information, controlling the first switching unit to select the first battery unit or the second battery unit to supply the terminal with electricity.

It can be known from the above technical solutions, the embodiments of the present invention provide a terminal and a charging and discharging method thereof. In the embodiment, the terminal may comprise two hardware systems, and a first and a second processing units corresponding to the two hardware systems respectively are connected. Wherein, the it processing unit may acquire the battery status information of its own and the other hardware system, and according to the status information of the two batteries, the first processing unit can flexibly control which one of the terminals to be charged by its own charging unit or control its own charging unit to charge the batteries of the two terminals simultaneously; or on the basis of the status information of two batteries, controls which one of the two terminal batteries should supply the terminal with electricity. It should be noted that the embodiment is also applicable to two connected terminals, wherein the processing unit of one terminal can acquire the status information of the batteries of two terminals and can control which battery should be charged on the basis of the status information of the battery; or can control which battery of the two batteries should supply the terminal with electricity.

DETAILED DESCRIPTION

For a better understanding of the solutions of the embodiments of the present invention by those skilled in the art, further detailed specifications of the embodiments of the present invention is given below with reference to the drawings and implementations.

Figure 1:
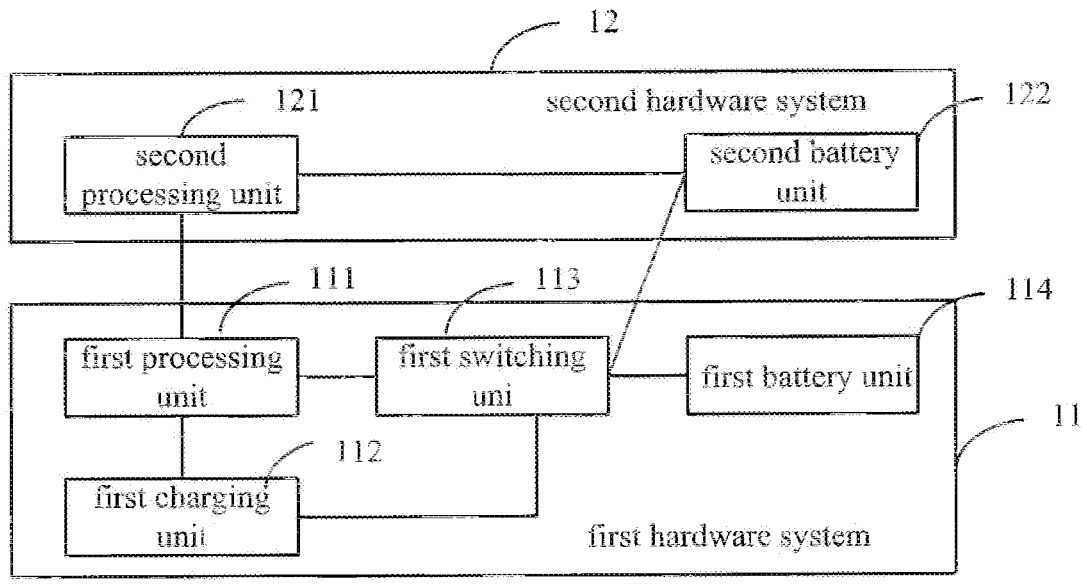
FIG. 1 is a first structural diagram of a terminal provided by the embodiment of the present invention.

With reference to FIG. 1, which is a structural diagram of a terminal provided by the embodiment of the present invention, the terminal comprises a first hardware system 11 and a second hardware system 12. The first hardware system 11 comprises a processing unit 111, a first charging unit 112, a first switching unit 113 and a first battery unit 114. The first processing unit 111 is connected to the first charging unit 112 and the first switching unit 113 respectively. The first switching unit 113 is connected to the first battery unit 114 and the first charging unit 112. The second hardware system 12 comprises a second processing, unit 121 and a second battery unit 122. The second processing unit 121 it connected to the second battery unit 122. The first processing unit 111 is connected to the second processing unit 121. The second battery unit 122 is connected to the first switching unit 113.

The first processing unit 111 acquires first status information of the first battery unit 114, and second status information of the second battery unit 122 via the second processing unit 121, and on the basis of the first status information, controls the first charging unit 112 to select to charge the first battery unit 114; or on the basis of the second status information, controls the first charging unit 112 to select to charge the second battery unit 122; or on the basis of the first status information and the second status information, controls the first charging unit 112 to select to charge the first battery unit 114 or the second battery unit 122; or on the basis of the first status information and/or the second status information, controls the first switching unit 113 to select the first battery unit 114 or the second battery unit 122 to supply the first hardware system 11 with electricity.

Wherein, in the embodiment, the first status information and the second status information can be charging priority identification, battery electricity quantity or battery temperature, or any combination of three, which are not limited by the present embodiment. Wherein, as for the charging priority identification, if the first processing unit 111 acquires at least the charging priority identifications of the two batteries, it selects preferably to charge the battery with the higher priority based on the priority of the battery; as for the battery electricity quantity, if the first processing unit 111 acquires the battery electricity quantities of the two batteries, it preferably selects to charge the battery with the lower charge quantity. As for the battery temperature, if the first processing unit 111 acquires the temperatures of the two batteries, it preferably selects to charge the battery with the lower temperature. Taking 45 degrees for example, it can preferably charge the battery with the temperature lower than 45 degrees. Of course, any combination of the above is also applicable, such as a comprehensive strategy taking both the priority identification and the battery electricity quantity into comprehensive consideration.

Further in this embodiment, if the selection is made based on battery temperature, the hardware system described above may further comprise a first temperature sensing unit such as a temperature sensor and the like) connected to the first processing unit 111 and the first battery unit 114 and a second temperature sensing unit (such as a temperature sensor and the like) connected to the second processing unit 121 and the second battery unit 122.

In this embodiment, since the first processing unit 111 in the first hardware system 11 of the terminal is connected to the second processing unit 121 in the second hardware system, wherein, the first processing unit 111 can acquire first status information of the first battery unit 114, and second status information of the second battery unit 122, and, on the basis of the first status information of the first battery unit 114, controls the first charging unit 112 of the first hardware system 11 to charge the first battery unit 114; or on the basis of the second status information of the second battery unit 122, controls the first charging unit 112 of the first hardware system 11 to charge the second battery unit 122; or on the basis of the first status information and the second status information, controls the first charging unit 112 of the first hardware system 11 to charge the first battery unit 114 and the second battery unit 122. Or the first processing unit 111 controls the first battery unit 114 or the second battery unit 122 to supply the first hardware system 11 with electricity.

Figure 2:
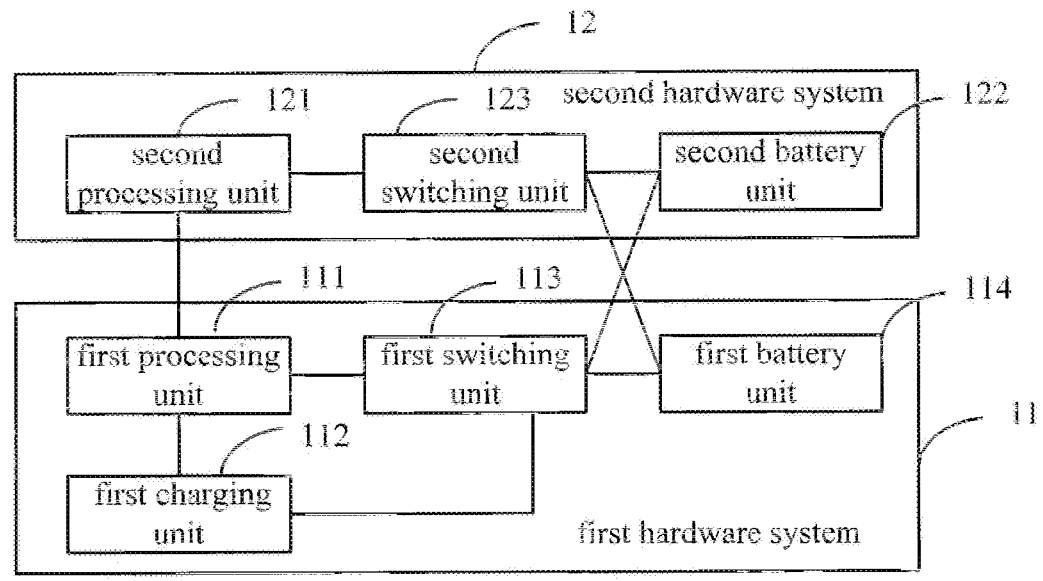
FIG. 2 is a second structural diagram of a terminal provided by the embodiment of the present invention.

On the basis of the embodiment of FIG. 1, the second hardware system 12 of the terminal further comprises, a second switching unit 123 connected to the second processing unit 121, the second battery unit 122 and the first battery unit 114 respectively, wherein, the second processing unit 121 acquires second status information of the second battery unit 122 and first status information of the first battery unit 114 via the first processing unit 111; on the basis of the first status information and/or the second status information, controls the second switching unit 123 to select the first battery unit 114 or the second battery unit 122 to supply the second hardware system 12 with electricity. Its specific structural diagram is shown in FIG. 2, which is a structural diagram of a terminal provided by the embodiment of the present invention.

In this embodiment, the second processing unit 121 can also acquire the first status information of the first battery unit 114; the second status information of the second battery unit 122; and on the oasis of the first status information of the first battery unit 114, controls the second switching unit 123 to select the first battery unit 114 to supply the second hardware system 12 with electricity; or on to basis of the second status information of the second battery unit 122, controls the second switching unit 123 to select the second battery unit to supply the second hardware system 12 with electricity. Wherein, if the first status information acquired by the second processing unit 121 is the electricity quantity information of the first battery unit 114 and the second status information is the electricity quantity information of the second battery unit 122, the power supply strategy is: comparing the electricity quantity information of the first battery unit 114 with the electricity quantity information of the second battery unit 122, and the battery with higher charge quantity is selected to supply electricity.

Based on the embodiment of FIG. 1, the second hardware system 12 of the terminal further comprises, a second charging unit 124 connected to the second processing unit 121 and the second battery unit 122. Wherein, the second processing unit 121 acquires second status information of the second battery unit 121, and first status information of the first battery unit 114 via the first processing unit 111; on the basis of the first status information and/or the second status information, controls the second charging unit 121 to charge the second battery unit 122. Its specific structural diagram is shown in FIG. 3, which is a structural diagram of a terminal provided by the embodiment of the present invention.

In this embodiment, the second processing unit 121 can acquire second status information of the second battery unit 122, and on the basis of the second status information of the second battery unit 122, controls the second charging unit 124 to charge the second battery unit 122. Wherein, the second status information is the electricity quantity information of the second battery unit 122. If the electricity quantity is low, it can control the second charging unit 124 to charge the second battery unit 122.

Figure 3:
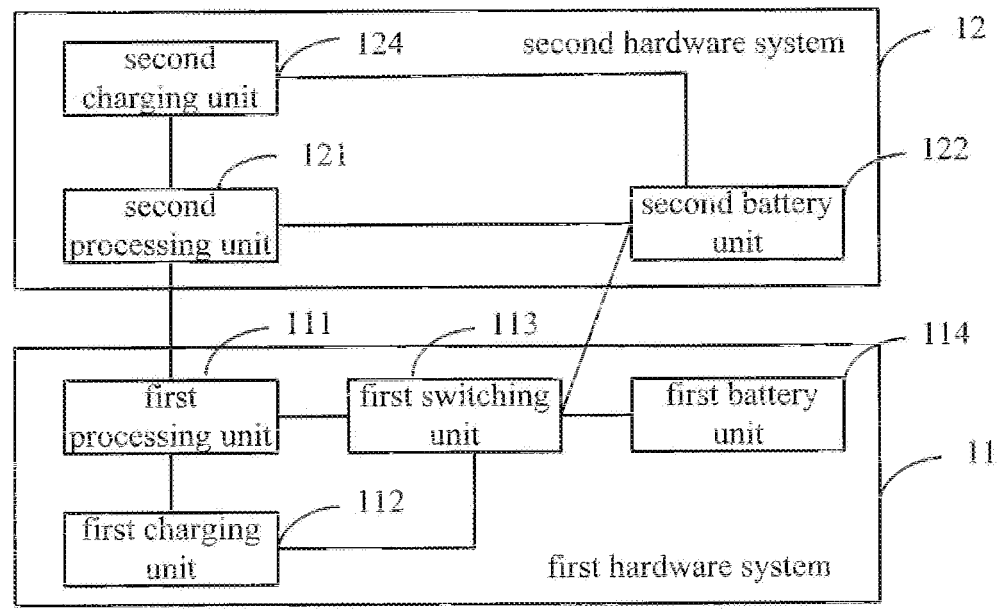
FIG. 3 is a third structural diagram of a terminal provided by the embodiment of the present invention.
Figure 4:
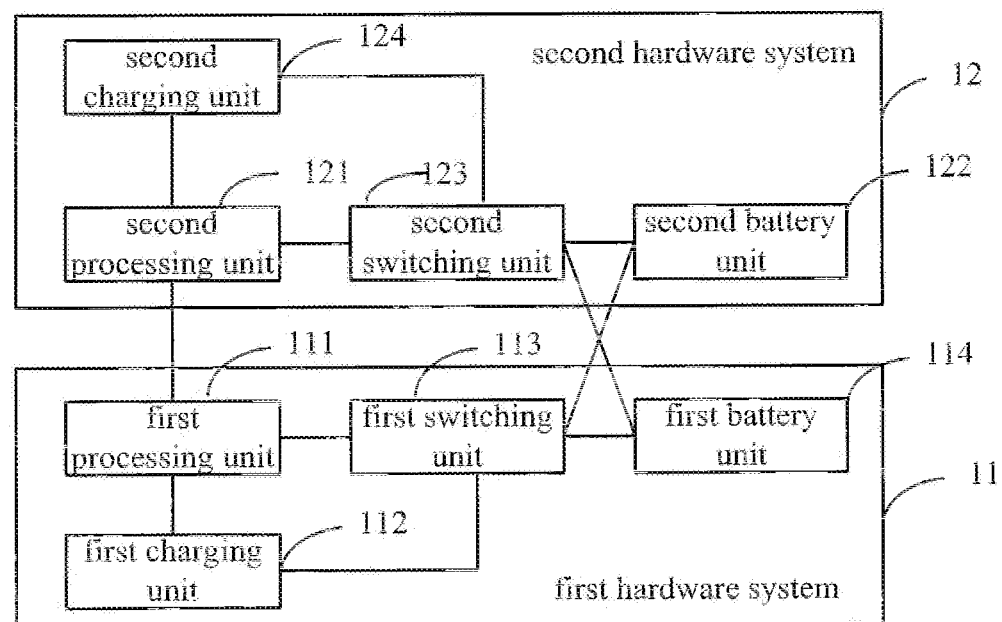
FIG. 4 is a fourth structural diagram of a terminal provided by the embodiment of the present invention.

Based on the embodiment of FIG. 3, the second hardware system 12 of the terminal further comprises, a second switching unit 123 connected to the second processing unit 121, the second charging unit 124, the second battery unit 122 and the first battery unit 114 respectively, wherein, the second processing unit 121 also acquires second status information of the second battery unit 122 and acquires first status information of the first battery unit 114 via the first processing unit 111, and on the basis of the first status information and/or the second status information, controls the second charging unit 124 to select to charge the first battery unit 114 and/or the second battery unit 122 via the second switching unit 124; or controls the second switching unit 123 to select the first battery unit 114 or the second battery unit 122 to supply the second hardware system 12 with electricity. Its specific structural diagram is shown in FIG. 4, which is a structural diagram of a terminal provided by the embodiment of the present invention.

In this embodiment, the first processing unit 111 can acquire first status information of the first battery unit 114, and second status information of the second battery unit 122, and on the basis of the first status information, controls the first charging unit 112 to charge the first battery unit 114; or on the basis of the second status information, controls the first charging unit 112 to charge the second battery unit 122; or on the basis of the first status information and the second status information, controls the first charging unit 112 to select to charge the first battery unit 114 and the second battery unit 122 sequentially, wherein it can select to charge the first battery unit 114 first and then select to charge the second battery unit 122 after the electricity quantity of the first battery unit 114 reaches a certain charging threshold. And then, after the electricity quantity of the second battery unit 122 reaches another charging threshold, if continues to charge the first battery unit 114 until the first battery unit is full, and then charges the second battery unit 122 until the second battery unit is full. Of course, it can select to charge the second battery unit 122 first, and then select to charge the first charging unit 114. The process is similar and thus the description is omitted.

Further, the second processing unit 121 can also acquire the first status information of the first battery unit 114; the second status information of the second battery unit 122; and on the basis of the first status information, controls the second charging unit 124 to charge the first battery unit 114; or on the basis of the second status information, controls the second charging unit 124 to charge the second battery unit 122; or on the basis of the first status information and the second status information, controls the second charging unit 124 to charge the first battery unit 114 and the second battery unit 122.

Further, on the basis of the acquired first status information of the first battery unit 114 and the acquired second status information of the second battery unit 122, the first processing unit 111 can control the first switching unit 113 to select the first battery unit 114 or the second battery unit 122 to supply the first hardware system with electricity; or on the basis of the acquired first status information of the first battery unit 114 and the acquired second status information of the second battery unit 122; the second processing unit 121 can control the first switching unit 113 to select the first battery unit 114 or the second battery unit 122 to supply the second hardware system 12 with electricity.

In the embodiments above, the first hardware system and the second hardware system can be understood as two hardware systems of one terminal and each hardware system can work independently. When connected, they can associate with each other and a sharing of battery power can be implemented. Or they can be understood as two portable devices of the terminal and each portable device has an independent hardware system. When connected, they can associate with each other and a sharing of battery power can be implemented. That is, the terminal provided by this embodiment can solve the charging and discharging process of the two battery power supply subs stems of two portable devices properly, and a bidirectional sharing of battery power between two portable devices and the simultaneous working thereof can be thereby allowed, so as to make it convenient to use and improve the stability and usability of the device.

That is in this embodiment, taking device A and device B as an example, device A and device B each has an independent battery power supply subsystem. When device A and device B are apart, the battery power supply sub-systems of device A and device B supply device A and device B with electricity respectively. When device A and device B are connected, the two independent battery power supply sub-systems are associated together and a bidirectional sharing of battery power is implemented.

For better understanding of the present invention, the description will be given with reference to specific examples hereinafter. In the following embodiments, device A and device B are still taken for example, which are, however not intended to limit. Device A and device B each has a corresponding hardware system, wherein the hardware system corresponding to each device may comprise, a processing unit, a charging unit, a switching unit and a battery unit. Of course, the hardware system may only comprise a processing unit and a battery unit; or a processing unit, a battery unit and a switching unit.

For convenience of description, the hardware systems corresponding to device A and device B in the following embodiments comprise a processing unit, a charging unit, a switching unit and a battery unit respectively, which are, however; not intended to limit. The hardware system may further comprise other units (such as a storage unit, other processing units, a communication unit and the like), which are not limited by the embodiment. Wherein, a first battery control management unit, a first charging unit, a first battery switching unit and a first battery unit are taken as corresponding examples of the processing unit, the charging unit, the switching unit and the battery unit of the hardware system of device A sequentially; a second battery control management unit, a second charging unit, a second battery switching unit and a second battery unit are taken as corresponding examples of the processing unit, the charging unit, the switching unit and the battery unit of the hardware system of device B respectively.

Figure 5:
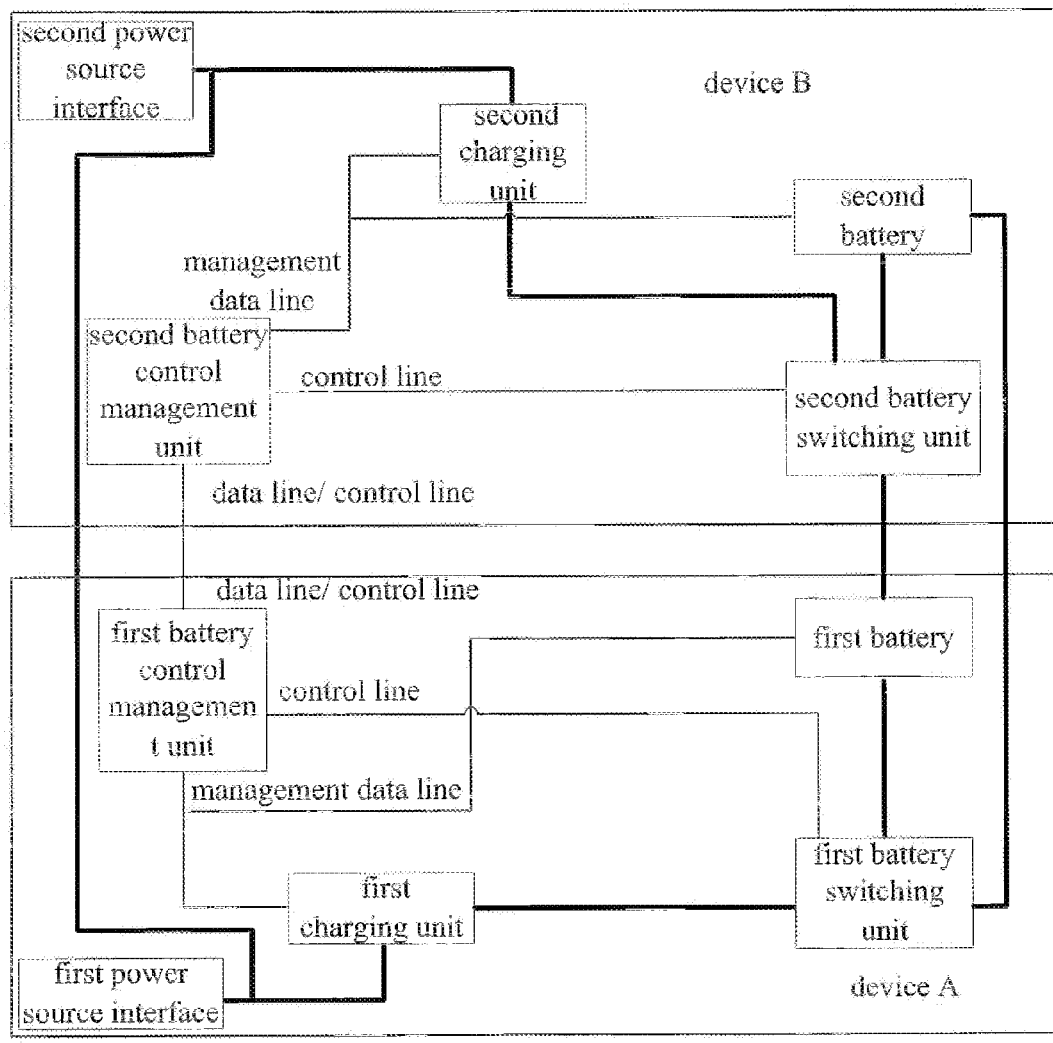
FIG. 5 is a structural diagram of connecting status of device A and device B of the embodiment of the present invention in the connected state.

With reference to FIG. 5, a structural diagram of the connection state of device A and device B of the embodiment of the present invention, namely, a further embodiment of the embodiment of FIG. 4, is illustrated. In this embodiment, the mode of connection between device A and device B includes, a wired connection or a wireless connection or a mixed connection, wherein the wired connection means the wired transmission of data and electric power including, a physical interface such as a slot mode, a contact mode and the like; a physical wire, such as a USB cable connection and the like; but it is not limited thereto and may further include other connection modes; the wireless connection refers to a wireless transmission of data and electric power, including, the Bluetooth data transmission, wireless charging and discharging by electromagnetic induction and the like, but it is not limited thereto and may also include other connections; the mixed connection refers to the wireless transmission of data, wired transmission of electric power or wired transmission of data and wireless transmission of electric power.

As shown in FIG. 5, the wired connection is taken as an example of the connection between device A and device 8, however, it is not limited thereto. Specifically, the first battery control management unit of device A and the second battery control management unit of device B can be connected via a control line (such as a general purpose input and output GPIO line) or a data line (such as a I2C bus and the like). The first battery control management unit is connected to the first battery the management data line of device A; the second battery control management unit is also connected to the second battery via the management data line of device B, wherein the management data line is, for example, a SMBUS (system management bus) and the like; the first battery control management unit is connected to the first battery switching unit via the control line of device A, and the second battery control management unit is also connected to the second battery switching unit via the control line of device B. The first charging unit is connected to the first battery control management unit, the first battery switching unit, the first power source interface respectively; the second charging unit is connected to the second battery control management unit, the second battery switching unit and the second power source interlace respectively. The connection between the first battery switching unit and the second battery as well as the connection between the second battery switching unit and the first battery can be a USE connections: the BATT+ output of the first battery is connected to the first battery switching unit of device A; the BATT+ output of the second battery is connected to the second battery switching unit of device B; the charging inputs of device A and device B are connected together. That is, the first power interface of device A is connected to the power source, and the first power interface is connected to the connecting line between the second power source interface and the second charging unit, so that device A and device B can be supplied with electricity simultaneously merely through the first power supply interface being connected to the external power supply. Similarly, if the second power source interface of device B is connected to the power source, the second power source interface is connected to the connecting line between the first power source interface and the first charging unit, so that device A and device B can be supplied with electricity simultaneously merely through the second power supply interface being connected to the external power source.

When device A and device B are apart, the first battery of device A supply electricity for device A independently; the second battery of device B supply electricity for device B independently; device A is charged independently, that is, the first battery of device A is charged from an external power source through the first power source interface and the first charging unit; device B is charged independently, that is, the second battery of device B is charged from an external power source through the second power source interface and the second char in unit.

Figure 6:
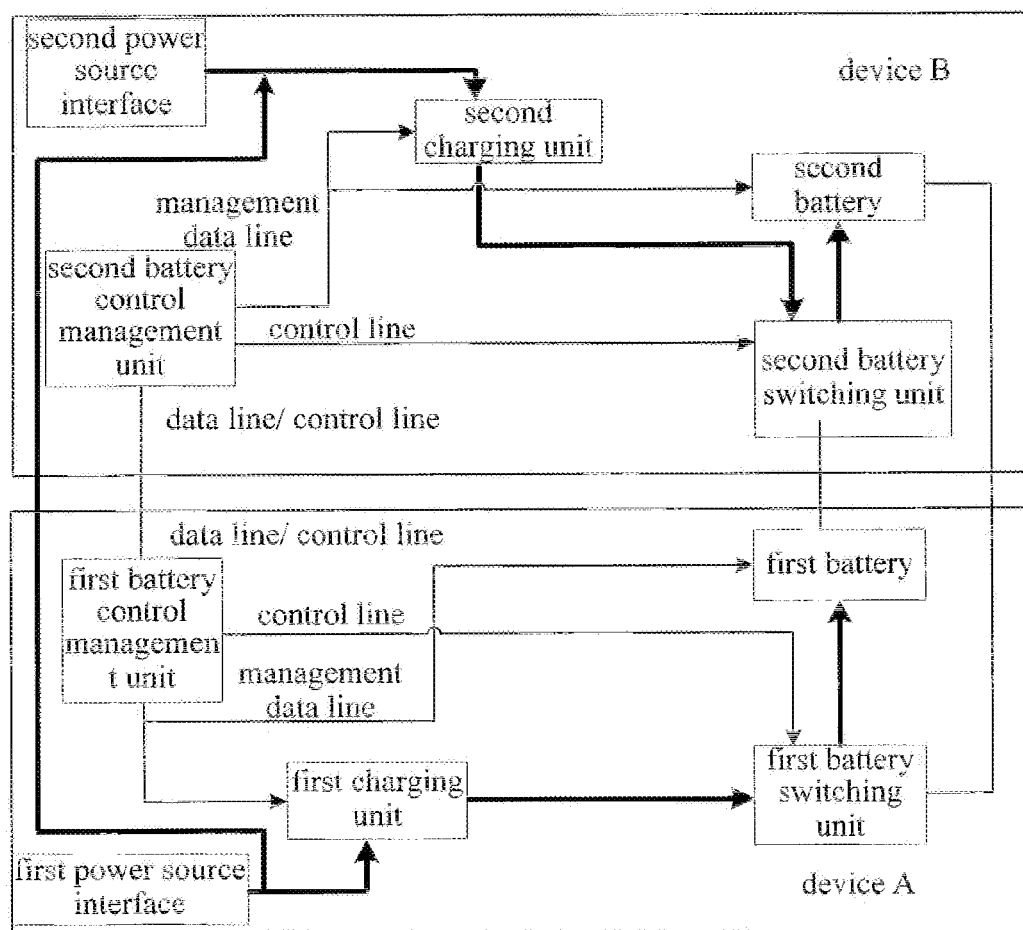
FIG. 6 is a logic block diagram of devices A and B charging the battery of device A and the battery of device B simultaneously when device A provided by the embodiment of the present invention is plugged into a charger.

When device A and device B are connected together and device A is connected to the power source through the first power source interface the first battery control management unit (such as an embedded controller EC and the like) acquires the first status information of the first battery through the management data line of device A and controls the first battery switching unit of device A to select the first charging unit to charge the first battery of device A according to the first status information via the management data line of device A. Similar, the second battery control management unit acquires the second status information of the second battery through the management data line of device B and controls the second battery switching unit of device B to select the second charging unit to supply electricity or the second battery of device A according to the second status information is the management data line of device B. It is specifically shown in FIG. 6, which is a logic block diagram of charging the battery of device A and the battery of device B in the embodiment of the present invention.

Figure 7:
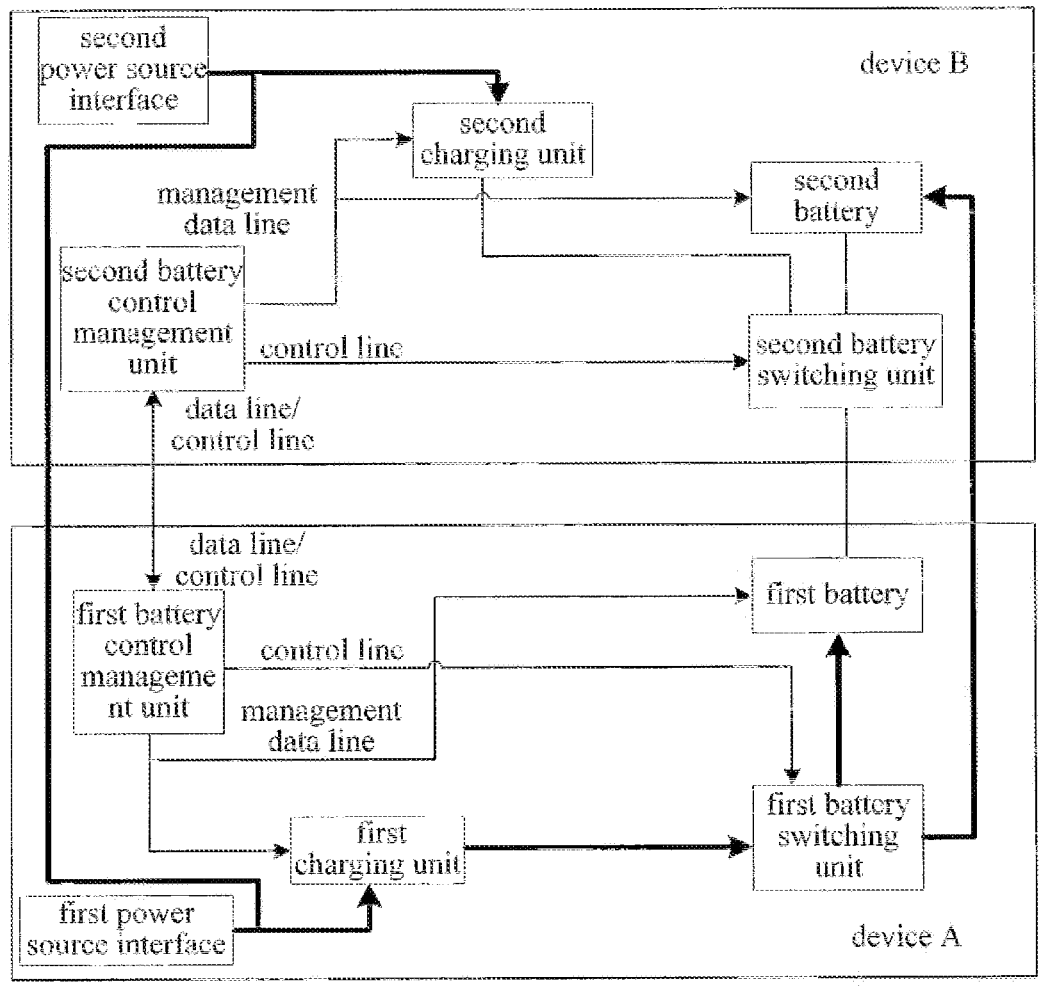
FIG. 7 is a logic block diagram showing that the device A charges the battery of device A and the battery of device B when device B malfunctions in an embodiment of the present invention.

Further if the charging circuit of device B (such as, the second charging unit or the cables in the charging circuit, similarly hereinafter malfunctions, the second battery control management unit of device B can feedback the failure information of the charging circuit of device B to the first battery control management unit of device A via the data line or the control line connected between device A and device B. After the first battery controlling management of device A receives the failure information of the charging circuit of device B, it takes over the operation of charging the battery of device B and can control the first charging unit and the first battery switching unit of device A according to preset strategies so charge the first battery of device A and the second battery of device B. Specifically, first, the first battery control management unit acquires first status information of the first battery unit (such as the electricity quantity information and the like) and second status information of the second battery unit via the second processing unit; then on the basis of the first status information, controls the first battery switching unit to select the first charging unit to charge the first battery unit; or on the basis of the second status information, may control the first battery switching unit to select the first charging unit to charge the second battery unit of device B since the first battery switching unit is connected to the second battery; or on the basis of the first status information and the second status information, controls the first switching unit to select the first charging unit to charge the first battery unit and the second battery unit in a time-sharing manner. The charging principle is shown in FIG. 7, which is a logic block diagram showing that the device A charges the battery of device A and the battery of device B when device B malfunctions in the embodiment of the present invention.

Figure 8:
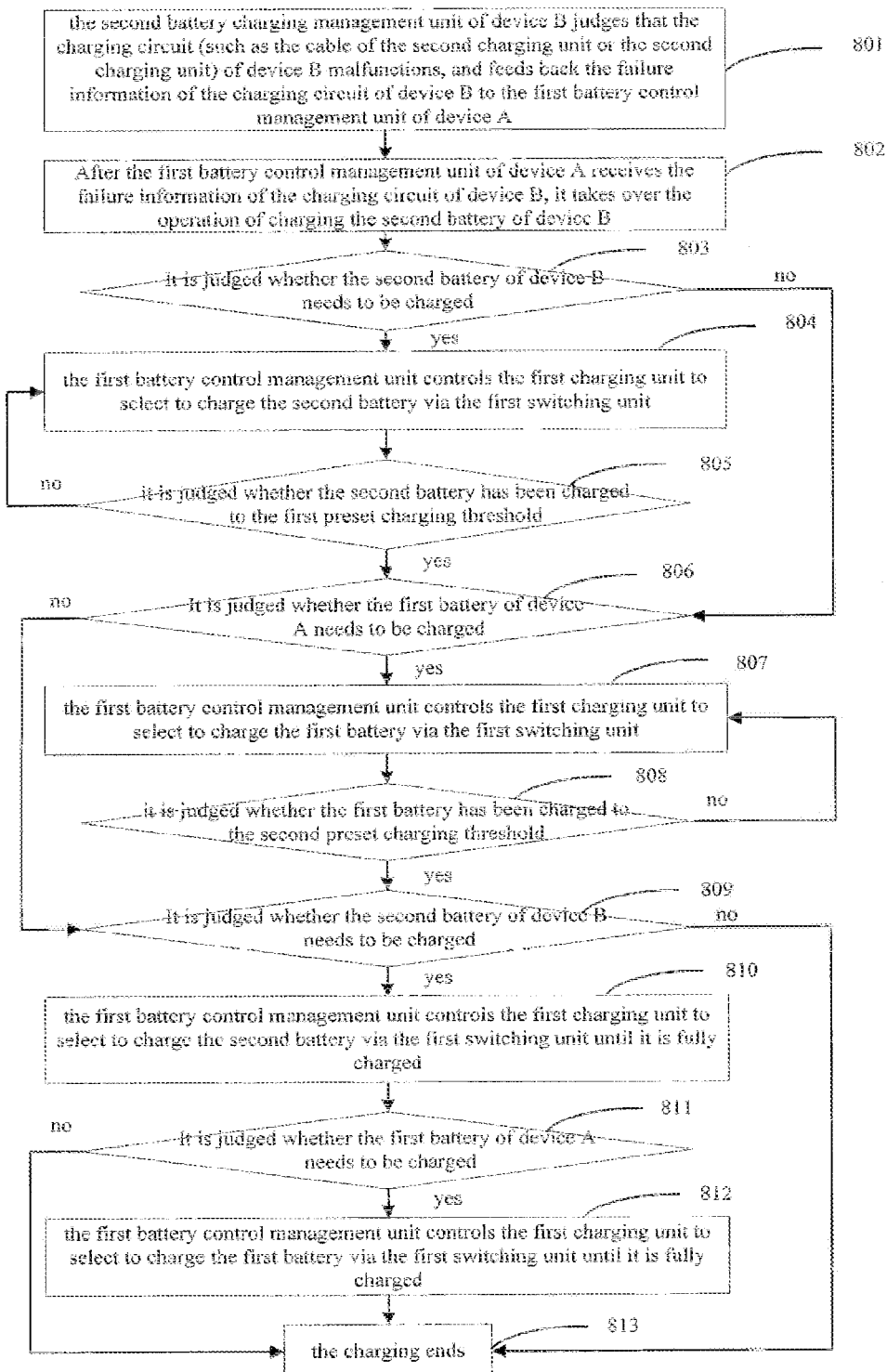
FIG. 8 is a flowchart showing that device A charges the battery of device A and the battery of device B when the charging circuit of device B malfunctions in an embodiment of the present invention.

With reference to FIG. 8, a flowchart in which the device A charges the battery of device A and the battery of device B when the charging circuit of device B malfunctions is shown, which specifically comprises.

At step 801, the second battery charging management unit of device B judges that the charging circuit (such as the cable of the second charging unit or the second charging unit, hereinafter the same) of device B malfunctions, and feeds back the failure information of the charging circuit, of device B to the first battery control management unit of device A; wherein, the failure information is a kind of the second status information; of course, if there is failure information of the charging circuit of device A, the failure information is also a kind of the first status information.

At step 802, After the first battery control management unit of device A receives the failure information of the charging circuit of device B, it takes over the operation of charging the second battery of device B;

At this time, if the first status information collected by the first battery control management unit is the priority information and electricity quantity information, and the second status information is the priority information and electricity quantity information of the second battery, the battery priority and the remaining electricity quantity is comprehensively considered according to the charging strategy of the first status information and the second status information, Specifically, taking the case where the charging priority of device B is higher and the charging threshold of device B is a first preset charging threshold and the charging threshold of device A is a second preset charging threshold as an example:

At step 803, the first battery control management unit judges whether the second battery of device B needs to be charged (whether the electricity quantity is lower than the first preset charging threshold). If yes, step 804 is performed; or else, step 806 is performed;

At step 804, the first battery control management unit controls the first charging unit to select to charge the second battery via the first switching unit;

At step 805, the first battery control management unit judges whether the second battery has been charged to the first preset charging threshold. If yes, step 806 is performed; or else, step 804 is returned;

At step 806, the first battery control management unit judges whether the first battery of device A needs to be charged (whether the charge quantity is lower than the second preset charging threshold). If yes, step 307 is performed; or else, step 809 is performed;

At step 807, the first battery control management unit controls the first charging unit to select to charge the first battery via the first switching unit;

At step 808, the first battery control management unit judges whether the first battery has been charged to the second preset charging threshold, if yes, step 309 is performed; or else, step 807 is returned;

At step 809, the first battery control management unit judges whether the second battery of device B needs to be charged (whether it is fully charged). If yes, step 810 is performed; or else, step 813 is performed;

At step 810, the first battery control management unit controls the first charging unit to select to charge the second battery via the first switching unit until it is fully charged;

At step 811, the first battery control management unit judges whether the first battery of device A needs to be charged (whether it is fully charged). If yes, step 812 is performed; or else, step 813 is performed;

At step 812, the first battery control management unit controls the first charging unit to select to charge the first battery via the first switching unit until it is fully charged;

At step 813, the charging ends.

Figure 9:
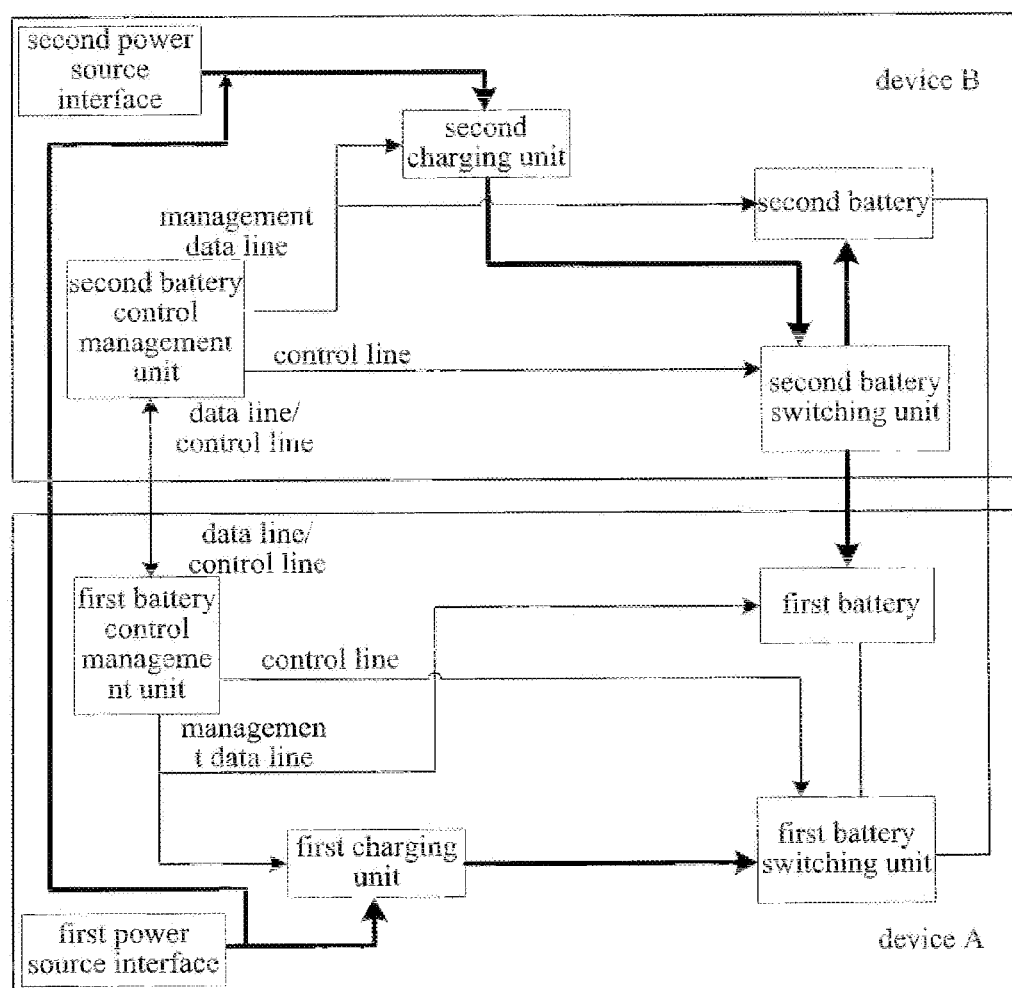
FIG. 9 is a logic diagram showing that the device B charges the battery of device A and the battery of device B when the charging circuit of device A malfunctions in an embodiment of the present invention.

Similarly, when the charging circuit of device A malfunctions, the first battery control management unit of device A may feeds back the failure information of the charging circuit of device A to the second battery control management unit of device B; and at the same time, the first battery control management unit of device A interrupts the charging circuit of device A. After the second battery control management unit of device B receives the failure information of the charging circuit of device A, it takes over the operation of charging the battery of device A, that is, device B can also charge the first battery of device A and the second battery of device B according to preset strategies. Wherein, the logic diagram of charging is shown in FIG. 9, which is a logic diagram showing that the device B charges the battery of device A and the battery of device B when the charging circuit of device A malfunctions. The charging process is similar with the process of device A charging the batteries of device A and device B, and the description is thus omitted.

When device A is combined with device B, the outputs of batteries A and B are simultaneously lead to devices A and B. During the process of discharging:

if the first and second battery control management units corresponding to devices A and B are connected by a data line, devices A and B both can acquire all the status information of batteries of devices A and B, and the first and the second battery charging management units corresponding to devices A and B independently control the corresponding switching units to switch between batteries of devices A and B according to preset strategies to supply the systems of devices A and B with electricity;

if the first and second battery control management units corresponding to devices A and B are connected by a control line (not limited to this connecting manner) such as a electrical status line, one of them, for example, device A, acquires all the status information of the batteries of devices A and B. When it is needed to switch between the batteries, the battery control management unit of device A controls the first battery switching unit of device A to switch to one of the batteries A and B according to preset strategies such as, according to the temperature and/or according to the priority identification and the like). Meanwhile, the first battery control management unit of device A notifies the second battery control management unit of device B to control the second battery switching unit of device B to switch between the batteries of devices A and B according to preset strategies via the status variation of the electrical status line.

Figure 10:
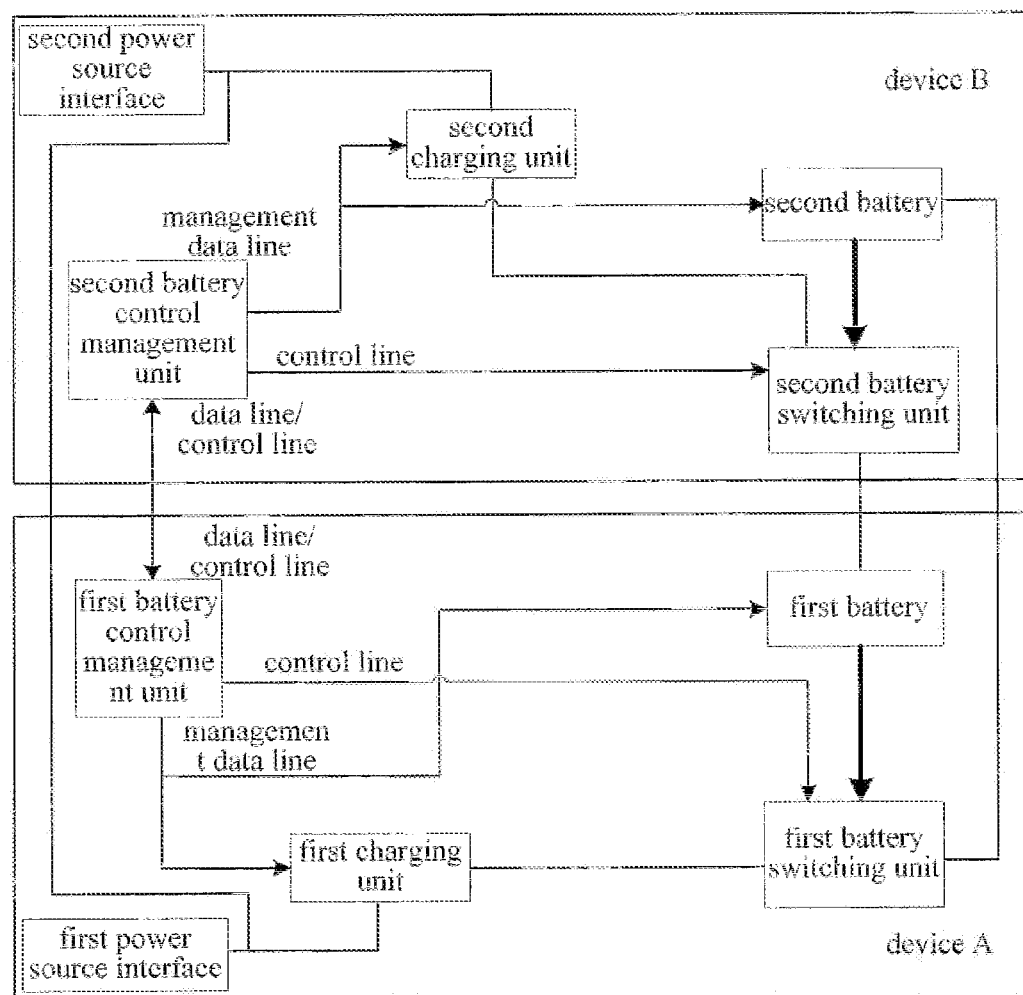
FIG. 10 is a logic block diagram showing, that the device A and device B supply electricity independently when device A and device B are connected in an embodiment of the present invention.

That is, in the case that device A and device B are connected, the discharging situations can be specifically divided into the following cases:

In the first case, the first battery control management unit of device A and the second battery control management unit of device B are connected. The first batter/control management unit acquires first status information of the first battery unit, and on the basis of the first status information, controls the first battery switching unit to select the first battery to supply device A with electricity; meanwhile, the second battery control management unit acquires second status information of the second battery unit, and on the basis of the second status information, controls the second battery switching unit to select the second battery to supply device B with electricity; it is shown specifically in FIG. 10, which is a logic block diagram showing device A and device B supplying electricity independently when device A and device B are connected in the embodiment of the present invention, in device A, the first battery supplies electricity to the first battery switching unit and supplies other system loads of device A with electricity via the first battery switching unit; the power supply manner of device B is the same to that of device A.

Figure 11:
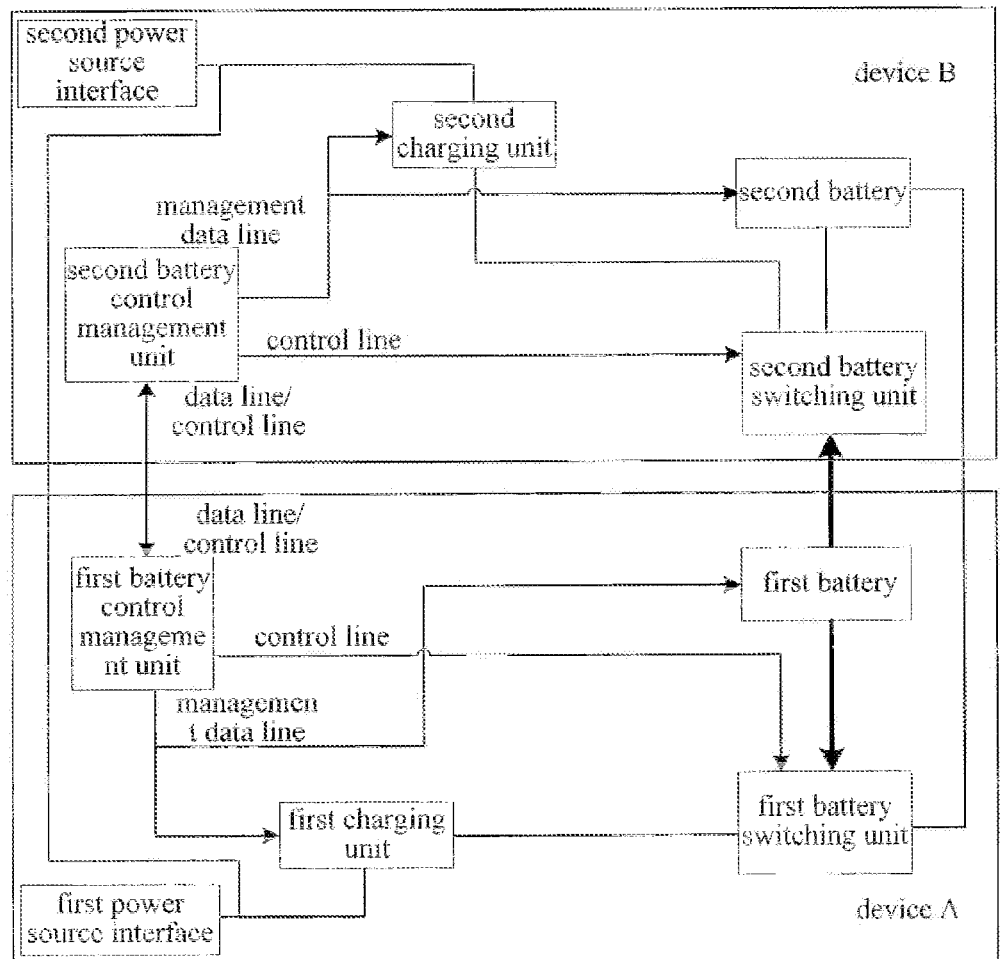
FIG. 11 is a logic block diagram showing that the battery of device A supplies device A and device B simultaneously with electricity when device A and device B are connected in an embodiment of the present invention.

In the second case, the first battery control management unit of device A and the second battery control management unit of device B are connected. The first battery control management unit and the second battery control management unit acquire first status information of the first battery unit and second status information of the second battery unit respectively; on the basis of the first status information, the first battery control management unit controls the first battery switching unit so select the first battery to supply device A with electricity; on the basis of the first status information, the second battery control management unit controls the second battery switching unit to select the first battery to supply device B with electricity; the case is specifically shown in FIG. 11, which is a logic block, diagram showing that device A supplies device A and device B simultaneously with electricity when device A and device B are connected in the embodiment of the present invention. In device B, the first battery in device A supplies electricity to the second battery switching unit and further the first battery in device A supplies electricity to other system loads of device B is the second battery switching unit.

Figure 12:
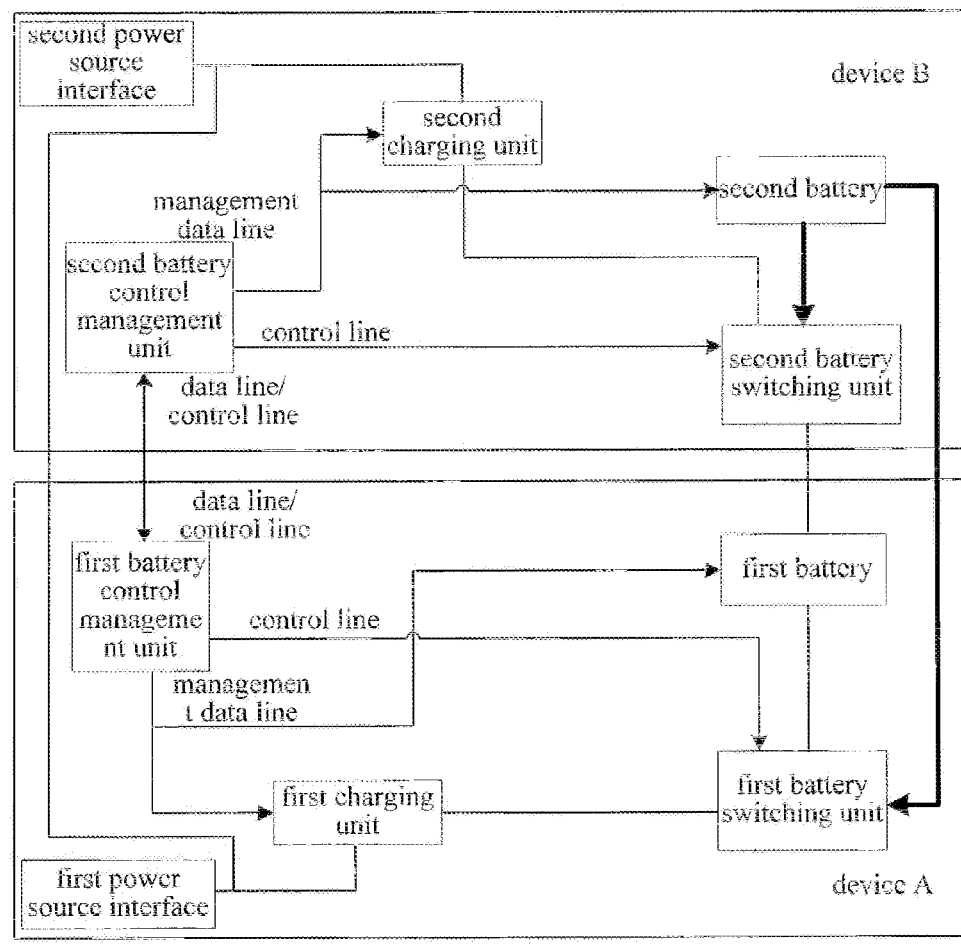
FIG. 12 is a logic block diagram showing that the battery of device B supplies device A and device B simultaneously with electricity when device A and device B are connected in an embodiment of the present invention.

In the third case, the first battery control management unit of device A and the second battery control management unit of device B are connected. The first battery control management unit and the second battery control management unit acquire first status information of the first battery unit and second status information of the second battery unit respectively; on the basis of the second status information, the first battery control management unit controls the first switching unit to select the second battery unit to supply device A with electricity; on the basis of the second status information, the second battery control management unit controls the second switching unit to elect the second battery unit to supply device B with electricity; the case is specifically shown in FIG. 12, which is a logic diagram showing that the device A supplies device A and device B simultaneously with electricity when device A and device B are connected in the embodiment of the present invention. In device A, the second battery in device B supplies electricity to the first battery switching unit and further the second battery in device supplies electricity for other system loads of device A via the first battery switching unit.

Figure 13:
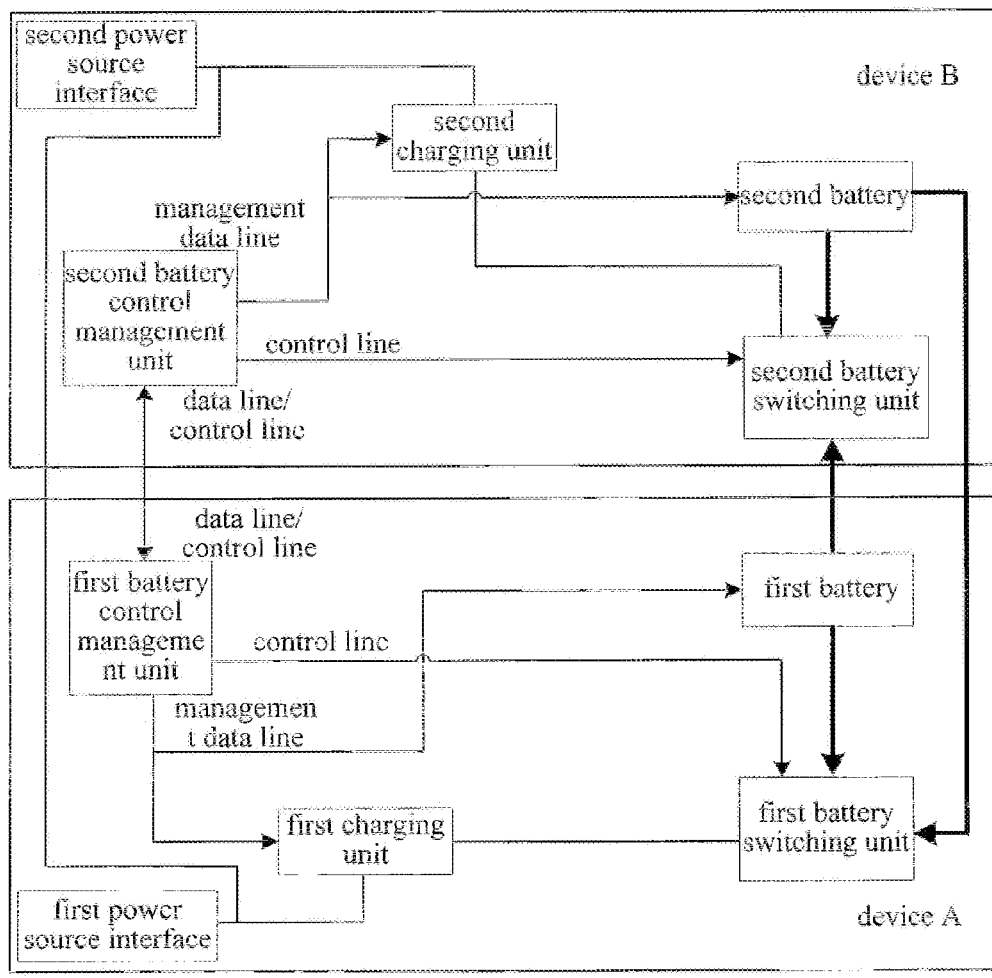
FIG. 13 is a logic block diagram showing that the batteries of device A and device B supply device A and device B successively with electricity when device A and device B are connected in an embodiment of the present invention.

The fourth case is a mixed case of the second case and the third case, that is at first the first battery supplies device A and device B with electricity simultaneously. When the remaining capacity of the first battery reaches the first preset discharging threshold, the second battery is switched and the second battery supplies electricity to device A and device B simultaneously. When the remaining capacity of the second battery reaches the second preset discharging threshold, the first battery is then switched for supplying device A and device B with electricity. When the remaining capacity of the first battery reaches the third preset threshold, a battery alarm is performed and the second battery is switched for supplying device A and device B with electricity. When the remaining capacity of the second battery reaches the fourth preset discharging threshold, a battery alarm is performed until both the first battery and the second battery are completely discharged; or, at first the second battery supplies device A and device B with electricity simultaneously, and then the first battery supplies device A and device B with electricity simultaneously. The power supply process is similar to the above and the description is thus omitted. The case is specifically shown in FIG. 13, which is a logic block diagram showing that the device B supplies device A and device B successively with electricity when device A and device B are connected in the embodiment of the present invention.

Figure 14:
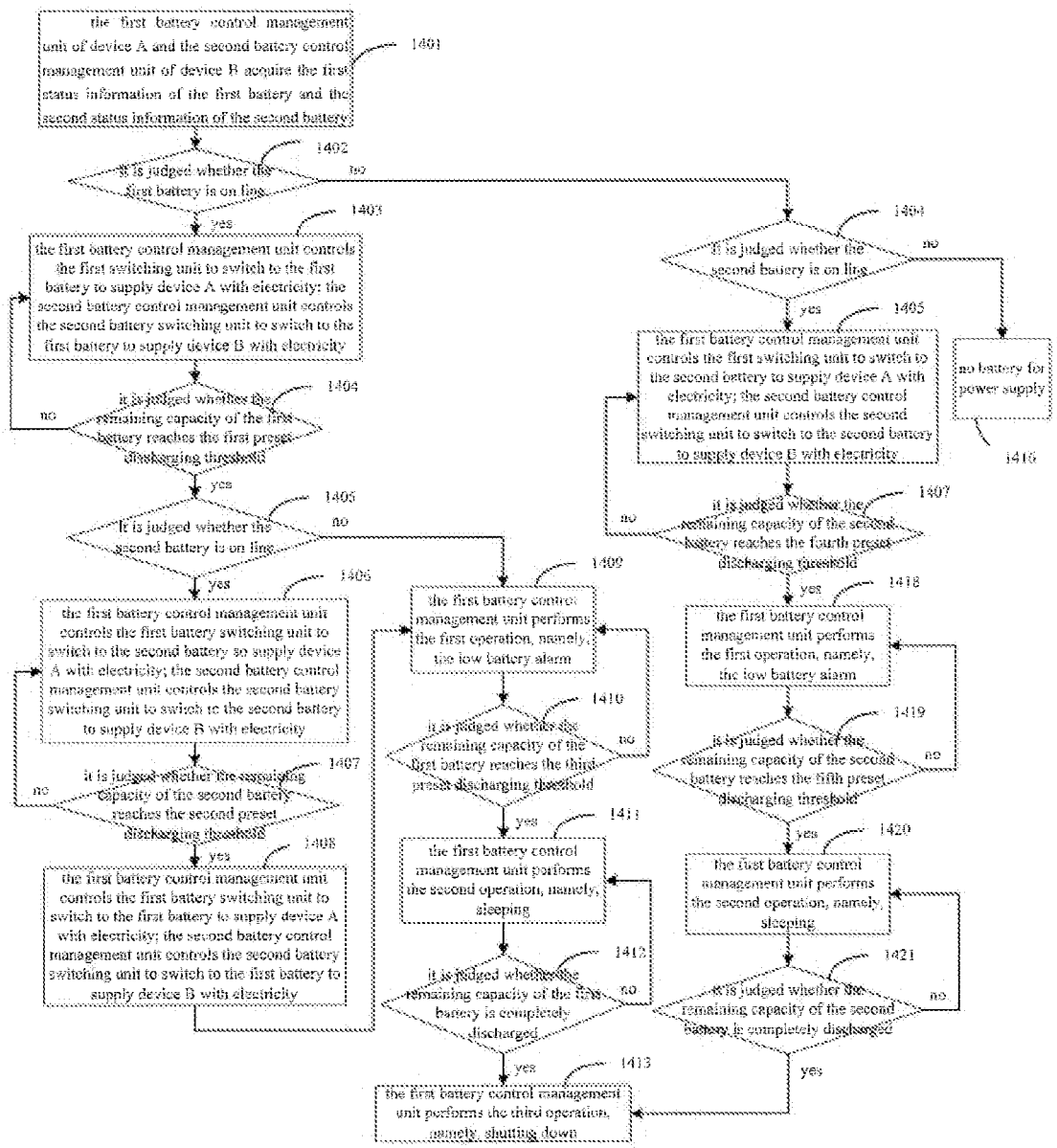
FIG. 14 is a flowchart showing the discharging process of the battery of device A combined with the battery of device B in an embodiment of the present invention.

For a further description of the power supply process when device A and device B are connected, the following specification is made by taking the mixed case as an example, which is specifically shown in FIG. 14, comprising, At step 1401, the first battery control management unit of device A and the second battery control management unit of device B acquire the first status information of the first battery and the second status information of the second battery;

At step 1402, the first battery control management unit fudges whether the first battery is on line. If yes, step 1403 is performed; or else, step 1414 is performed;

At step 1403, the first battery control management unit controls the first switching unit to switch to the first battery to supply device A with electricity, and notifies the second battery control management unit that the first battery is on line. The second battery control management unit controls the second battery switching unit to switch to the first battery to supply device B with electricity.

At step 1404, the first battery control management unit judges whether the remaining capacity of the first battery reaches the first preset discharging threshold. If not, the process goes back to step 1403; if yes, step 1405 is performed;

At step 1405, the first battery control management unit judges whether the second battery is on line via the second battery control management unit. If yes, step 1406 is performed; or else, step 1409 is performed;

At step 1406, the first battery control management unit controls the first battery switching unit to switch to the second battery so supply device A with electricity; the second battery control management unit controls the second battery switching unit to switch to the second battery to supply device B with electricity;

At step 1407, the first battery control management unit judges whether the remaining capacity of the second battery reaches the second preset discharging threshold via the second battery control management unit. It not, step 1406 is performed; if yes, step 1406 is performed;

At step 1408, the first battery control management unit controls the first battery switching unit to switch to the first battery to supply device A with electricity; the second battery control management unit controls the second battery switching unit to switch to the first battery to supply device B with electricity;

At step 1409, the first battery control management unit performs the first operation namely, the low battery alarm;

At step 1410, the first battery control management unit judges whether the remaining capacity of the first battery reaches the third preset discharging threshold, if rot, the process is returned to step 1409; if yes, step 1411 is performed;

At step 1411, the first battery control management unit performs the second operation, namely, sleeping;

At step 1412, the first battery control management unit judges whether the remaining capacity of the first battery is completely discharged if yes, step 413 is performed; or else, step 1411 is performed;

At step 1413, the first battery control management unit performs the third operation, namely, shutting down;

At step 1414, the first battery control management unit judges whether the second battery is on fine via the second battery control management unit. If yes, step 1415 is performed; or else, step 1406 is performed, namely, there's no battery for power supply and the power supply process ends.

At step 1415, the first battery control management unit controls the first switching unit to switch to the second battery to supply device A with electricity; the second battery control management unit controls the second switching unit to switch to the second battery to supply device B with electricity;

At step 1417, the first battery control management unit judges whether the remaining capacity of the second battery reaches the fourth preset discharging threshold. If not, the process goes back to step 1415; if yes, step 1418 is performed;

At step 1418, the first battery control management unit performs the first operation; namely, the low battery alarm;

At step 1419, the first battery control management unit judges whether the remaining capacity of the second battery reaches the fifth preset discharging threshold. If not, the process is returned to step 1418; if yes, step 1420 is performed;

At step 1420, the first battery control management unit performs the second operation, namely, sleeping;

At step 1421, the first battery control management unit judges whether the remaining capacity of the second battery is completely discharged. If yes step 1413 is performed; or else, the process is returned to step 1420;

Seen from the above-described embodiment, when the terminal is connected with a second terminal (such as devices A and B, the two terminals (such as devices A and B) can share the energy status information of the batteries of the two terminals (such as the devices A and B); and on the basis of the status information the battery of device A and the battery of device B can be shared and the batteries of devices A and B can be selected to supply devices A and B with electricity simultaneously, according to preset strategies.

Figure 15:
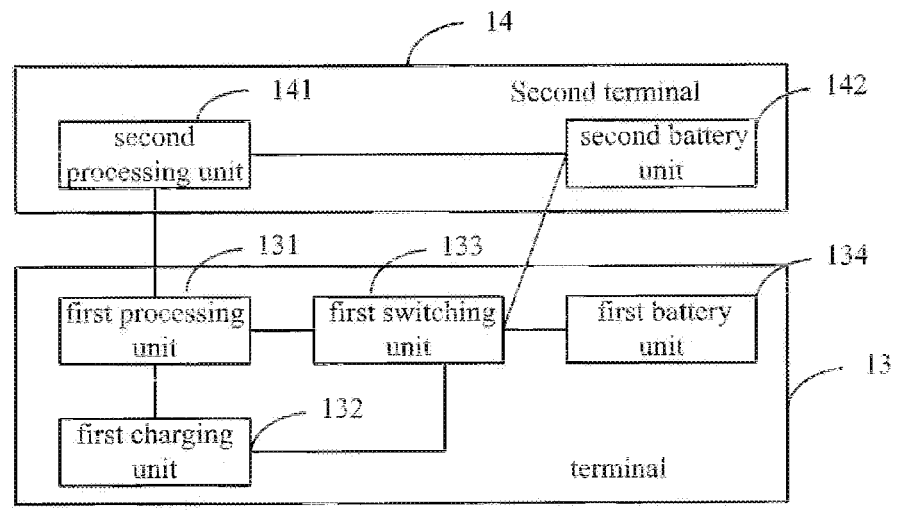
FIG. 15 is a first structural diagram of another terminal provided by an embodiment of the present invention.

Correspondingly, the embodiment of the present invention further provides another terminal 13, a first structural diagram of which is shown in FIG. 15. The terminal comprises: a first processing unit 131, a first charging unit 132, a first switching unit 133 and a first battery unit 134. The first processing unit 131 is connected to the first charging unit 132 and the first switching unit 133 respectively. The first processing unit 131 of the terminal is connected to the second processing unit 141 of the second terminal 14; the first; switching unit 133 is connected to the first battery unit 134 and the second battery unit 142 of the second terminal 14 respectively; wherein, The first processing unit 131 controls the first charging unit 132 to select to charge the first battery unit 134 or/and the second battery unit 142 via the first switching unit 133; or, The first processing unit 131 acquires first status information of the first battery unit 134, and/or second status information of the second battery unit 142 via the second processing unit 141; and controls the first switching unit 133 to select the first battery unit 134 or the second battery unit 142 to supply the terminal with electricity.

Figure 16:
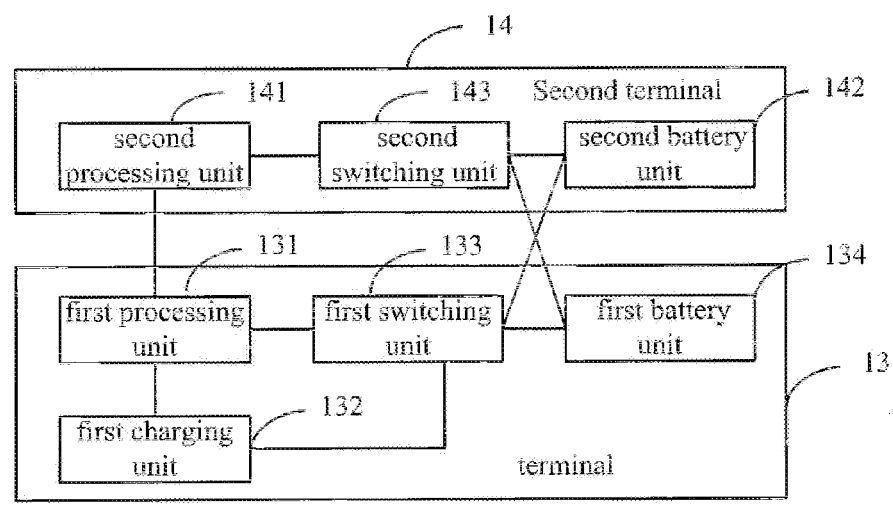
FIG. 16 is a second structural diagram of another terminal provided by an embodiment of the present invention.

Optionally, the terminal further comprises, the first battery unit 134 connected to the second switching unit 143 of the second terminal 14. Wherein, the second switching unit 143 is also connected to the second processing unit 141 the first battery unit 134 and the second battery unit 142; the first processing unit 131 further instructs the second processing unit 141 to control the second switching unit 143 to select the first battery unit 134 or the second battery unit 142 to supply the second terminal 14 with electricity. The second structural diagram of the said another terminal is specifically shown in FIG. 16, which is the second structural diagram of another terminal provided by the embodiment of the present invention.

Figure 17:
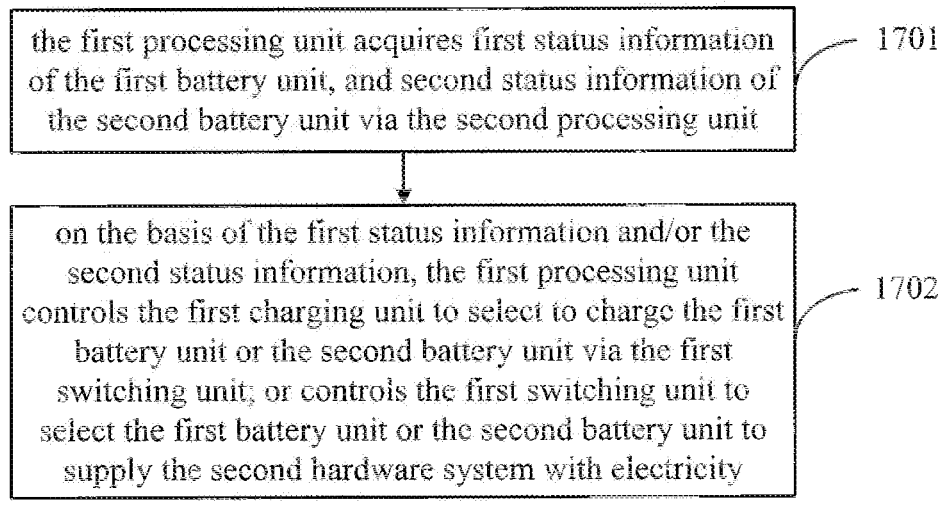
FIG. 17 is a flowchart, of charging and discharging method of a terminal provided by an embodiment of the present invention.

Based on the implementation process of the terminal described above, a charging and discharging method is provided by an embodiment of the present invention, the flowchart of which is shown in detail in FIG. 17. In this embodiment, the terminal comprise; a first hardware system and a second hardware system. The first hardware system comprises; a first processing unit, a first charging unit, a first switching unit and a first battery unit. The first processing unit is connected to the first charging unit and the first switching unit respectively. The first switching unit is connected to the first battery unit and the first charging unit. The second hardware system comprises; a second processing unit and a second battery unit. The second processing unit is connected to the second battery unit and the second battery unit is connected to the first switching unit. The first processing unit is connected to the second processing unit. The method comprises the following.

At step 1701, the first processing unit acquires first status information of the first battery unit, and second status information of the second battery unit via the second processing unit;

At step 1702, on the basis of the first status information, the first processing unit controls the first charging unit to select to charge the first battery unit; or on the basis of the second status information, controls the first charging unit to select to charge the second battery unit; or on the basis of the first status information and the second status information, controls the first charging unit to select to charge the first battery unit or the second battery unit; or on the basis of the first status information and the second status information, controls the first charging unit to select to charge the corresponding first battery unit and second battery unit via the first switching unit.

Preferably, when the second hardware system comprises a second switching unit connected to the second processing unit, the first battery unit and the second battery unit respectively, the method further comprises:

the second processing unit acquires second status information of the second battery unit thereof, and first status information of the first battery unit via the first processing unit;

On the basis of the first status information and/or the second status information, the second processing unit controls the second switching unit to select the first battery unit or the second battery unit to supply the second hardware system with electricity.

When the second hardware system comprises a second charging unit connected to the second processing unit, the method further comprises:

the second processing unit acquires second status information of the second battery unit, and first status information of the first battery unit via the first processing unit;

On the basis of the first status information and/or the second status information, the second charging unit charges for the second battery unit.

Preferably, when the second hardware system comprises a second switching unit connected to the second processing unit, the second charging unit, the second battery unit and the first battery unit respectively, the method further comprises:

the second processing unit acquires first status information of the first battery unit, and second status information of the second battery unit via the second processing unit; on the basis of the first status information, controls the second charging unit to select to charge the first battery unit via the second switching unit; or on the basis of the second status information, controls the second charging unit to select to charge the second battery unit via the second switching unit; or on the basis of the first status information and the second status information, controls the second charging unit to select to charge the first battery unit or the second battery unit via the second switching unit; or, on the basis of the first status information and/or the second status information, the second processing unit controls the second switching unit to select the first battery unit or the second battery unit to supply the second hardware system with electricity.

Figure 18:
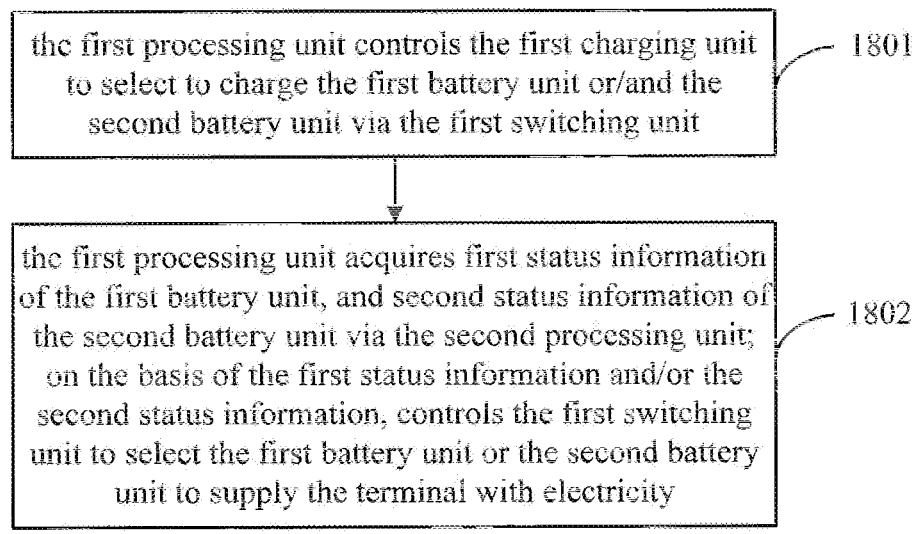
FIG. 18 is a flowchart of charging and discharging method of another terminal provided by an embodiment of the present invention.

Correspondingly, the present invention further provides another method for charging and discharging terminals, the flowchart of which is shown in detail in FIG. 18. In this embodiment, the terminal comprises: a first processing unit, a first charging unit, a first switching unit and a first battery unit. The first processing unit is connected to the first charging unit and the first switching unit respectively. The first processing unit and the first charging unit is connected to the second processing unit of a second terminal; the first switching unit is connected to the first battery unit and the second battery unit of the second terminal respectively; the method comprises the following:

At step 1801, the first processing unit controls the first charging unit to select to charge the first battery unit or/and the second battery unit via the first switching unit; or At step 1802, the first processing unit acquires first status information of the first battery unit, and second status information of the second battery unit via the second processing unit; on the basis of the first status information and/or the second status information, controls the first switching unit to select the first battery unit or the second battery unit to supply the terminal with electricity.

Preferably, when the first battery unit of the terminal is connected to the second switching unit of the second terminal and the second switching unit is also connected to the second processing unit, the first battery unit and the second battery unit, the method further comprises:

the first processing unit instructs the second processing unit to control the second switching unit to select the first battery unit or the second battery unit to supply the second terminal with electricity.

Seen from the above-described embodiment, the embodiment of the present invention proposes a terminal and a method thereof to reasonably solve the charging and discharging process between two battery power supply subsystems of two portable devices or two terminals, and a bidirectional sharing of battery power between two portable terminals and their simultaneous working is thereby allowed so as to make it convenient so use and improve the stability and usability of the device. Or, when two terminals are connected, the battery power supply sub-systems corresponding to the terminals are also associated so that a bidirectional sharing is allowed. In this embodiment, the two portable devices A and B each has an independent battery rower supply subsystem. When devices A and B are apart, the battery power supply sub-systems of device A and B charge device A and B, respectively. When devices A and B are connected, the two independent battery power supply sub-systems are also associated and implement a bidirectional battery power sharing.

It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

Through the above description of the implementations, those skilled in the art can clearly understand that the present invention can be implemented by means of software and necessary general hardware platforms, or of course, by hardware, but in most cases the former is the better implementation. Based on such understanding, the technical solution of the present invention as a whole or the part thereof that contributes to the prior art can be embodied in the form of a software product. The computer software product can be stored in storage media, such as ROM/RAM, magnetic disks, optical disks and the like, comprising instructions to make a computer device (may be a personal computer, sever, or network device and the like) implement the said method of each embodiment, or some parts of the embodiments of the present invention.

The above descriptions are only preferred implementations of the present invention. It should be noted that for those skilled in the art, several improvements and modifications may be made without departing from the principle of the present invention, and these improvements and modifications should also be included in the protection scope of the present invention.

What is claimed is:

1. A terminal, comprising: a first hardware system and a second hardware system, the first hardware system comprising, a first processing unit, a first charging unit, a first switching unit, and a first battery unit, the first processing unit being connected to the first charging unit and the first switching unit respectively, the first switching unit being connected to the first battery unit and being directly connected to the first charging unit; the second hardware system comprising a second processing unit and a second battery unit, the second processing unit being connected to the second battery unit, the first processing unit being directly connected to the second processing unit, the second battery unit being connected to the first switching unit, wherein,
    the first processing unit acquires first status information of the first battery unit, and second status information of the second battery unit via the second processing unit; and on the basis of the first status information, controls the first charging unit to select to charge the first battery unit; or on the basis of the second status information, controls the first charging unit to select to charge the second battery unit; or on the basis of the first status information and the second status information, controls the first charging unit to select to charge the first battery unit or the second battery unit; or on the basis of the first status information and/or the second status information, controls the first switching unit to select the first battery unit or the second battery unit to supply the first hardware system with electricity.

2. The terminal according to claim 1, wherein the second hardware system further comprises a second switching unit connected to the second processing unit, the second battery unit and the first battery unit respectively, wherein,
    the second processing unit acquires the second status information of the second battery unit, and the first status information of the first battery unit via the first processing unit; on the basis of the first status information and/or the second status information, controls the second switching unit to select the first battery unit or the second battery unit to supply the second hardware system with electricity.

3. The terminal according to claim 1, wherein, the second hardware system further comprises: a second charging unit connected to the second processing unit and the second battery unit, wherein,
    the second processing unit acquires the second status information of the second battery unit, and the first status information of the first battery unit via the first processing unit; on the basis of the first status information and/or the second status information, controls the second charging unit to charge the second battery unit.

4. The terminal according to claim 3, wherein, the second hardware system further comprises a second switching unit connected to the second processing unit, the second charging unit, the second battery unit and the first battery unit respectively, wherein,
    the second processing unit further acquires the second status information of the second battery unit, and the first status information of the first battery unit via the first processing unit; on the basis of the first status information, controls the second charging unit to select to charge the first battery unit via the second switching unit; or on the basis of the second status information, controls the second charging unit to select to charge the second battery unit via the second switching unit; or on the basis of the first status information and the second status information, controls the second charging unit to select to charge the first battery unit or the second battery unit via the second switching unit; or on the basis of the first status information and/or the second status information, controls the second switching unit to select the first battery unit or the second battery unit to supply the second hardware system with electricity.

5. A terminal, comprising: a first processing unit, a first charging unit, a first switching unit, and a first battery unit, the first processing unit being connected to the first charging unit and the first switching unit respectively, the first processing unit of the terminal being directly connected to the second processing unit of a second terminal; the first switching unit being directly connected to the first battery unit, the first charging unit and the second battery unit of the second terminal respectively, wherein, the first processing unit controls the first charging unit to select to charge the first battery unit or/and the second battery unit via the first switching unit; or, the first processing unit acquires first status information of the first battery unit, and second status information of the second battery unit via the second processing unit; and on the basis of the first status information and/or the second status information, controls the first switching unit to select the first battery unit or the second battery unit to supply the terminal with electricity.

6. The terminal according to claim 5, further comprising: the first battery unit of the terminal being connected to the second switching unit of the second terminal, wherein, the second switching unit is further connected to the second processing unit, the first battery unit and the second battery unit; the first processing unit further instructs the second processing unit to control the second switching unit to select the first battery unit or the second battery unit to supply the second terminal with electricity.

7. A charging and discharging method of a terminal, the terminal comprising: a first hardware system and a second hardware system, the first hardware system comprising: a first processing unit, a first charging unit, a first switching unit, and a first battery unit, the first processing unit being connected to the first charging unit and the first switching unit respectively, the first switching unit being connected to the first battery unit and being directly connected to the first charging unit; the second hardware system comprising: a second processing unit and a second battery unit, the second processing unit being directly connected to the second battery unit, the second battery unit being connected to the first switching unit, the first processing unit being connected to the second processing unit; the method comprising:

the first processing unit acquiring first status information of the first battery unit, and second status information of the second battery unit via the second processing unit;

the first processing unit, on the basis of the first status information, controlling the first charging unit to select to charge the first battery unit; or on the basis of the second status information, controlling the first charging unit to select to charge the second battery unit; or on the basis of the first status information and the second status information, controlling the first charging unit to select to charge the first battery unit or the second battery unit; or on the basis of the first status information and/or the second status information, controlling the first switching unit to select the first battery unit or the second battery unit to supply the first hardware system with electricity.

8. The method according to claim 7, wherein when the second hardware system comprises a second switching unit connected to the second processing unit, the first battery unit and the second battery unit respectively, the method further comprises:

the second processing unit acquiring the second status information of the second battery unit, and the first status information of the first battery unit via the first processing unit;

the second processing unit, on the basis of the first status information and/or the second status information, controlling the second switching unit to select the first battery unit or the second battery unit to supply the second hardware system with electricity.

9. The method according to claim 7, wherein when the second hardware system comprises a second charging unit connected to the second processing unit and the second battery unit, the method further comprises:

the second processing unit acquiring the second status information of the second battery unit, and the first status information of the first battery unit via the first processing unit;

the second processing unit, on the basis of the first status information and/or the second status information, controlling the second charging unit to charge the second battery unit.

10. The method according to claim 9, wherein, when the second hardware system comprises a second switching unit connected to the second processing unit, the second charging unit, the second battery unit and the first battery unit respectively, the method further comprises:

the second processing unit acquiring the second status information of the second battery unit, and acquiring the first status information of the first battery unit via the first processing unit; on the basis of the first status information, controlling the second charging unit to select to charge the first battery unit via the second switching unit; or on the basis of the second status information, controlling the second charging unit to select to charge the second battery unit via the second switching unit; or on the basis of the first status information and the second status information, controlling the second charging unit to select to charge the first battery unit or the second battery unit via the second switching unit; or, the second processing unit, on the basis of the first status information and/or the second status information, controlling the second switching unit to select the first battery unit or the second battery unit to supply the second hardware system with electricity.

11. A charging and discharging method of a terminal, the terminal comprising: a first processing unit, a first charging unit, a first switching unit and a first battery unit, the first processing unit being connected to the first charging unit and the first switching unit respectively, the first processing unit of the terminal being directly connected to the second processing unit of the second terminal; the first switching unit being directly connected to the first battery unit, the first switching unit and the second battery unit of the second terminal respectively; the method comprising: the first processing unit controlling the first charging unit to select to charge the first battery unit or/and the second battery unit via the first switching unit; or the first processing unit acquiring first status information of the first battery unit, and second status information of the second battery unit via the second processing unit; and on the basis of the first status information and/or the second status information, controlling the first switching unit to select the first battery unit or the second battery unit to supply the terminal with electricity.

12. The method according to claim 11, wherein, when the first battery unit of the terminal is connected to the second switching unit of the second terminal and the second switching unit is further connected to the second processing unit, the first battery unit and the second battery unit, the method further comprising:

the first processing unit instructing the second processing unit to control the second switching unit to select the first battery unit or the second battery unit to supply the second terminal with electricity.

* * * * *